Figure 1:
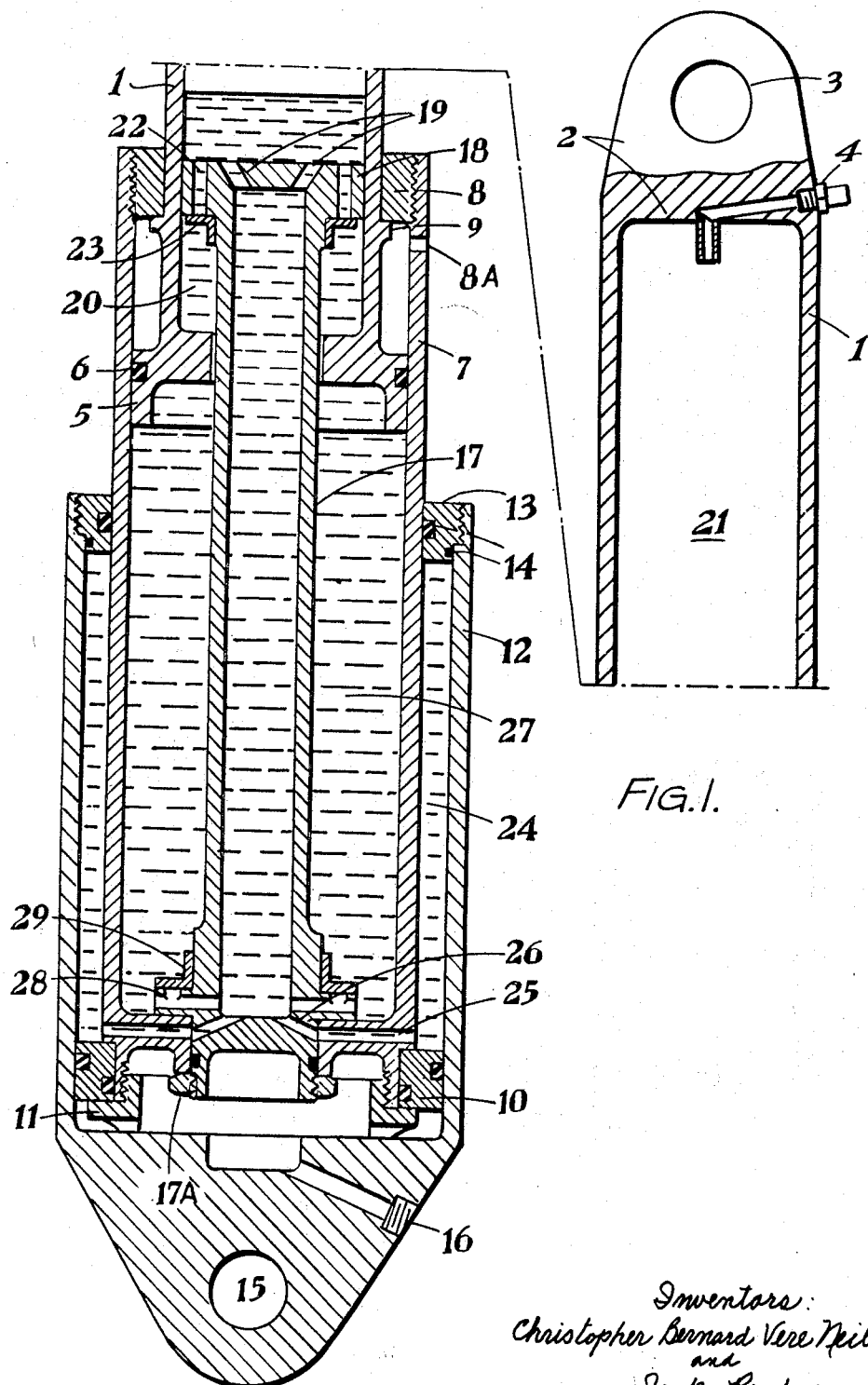

United States Patent Office 3,322,393
Patented May 30, 1967

3,322,393
HYDRO-PNEUMATIC SHOCK ABSORBER
AND JACKING DEVICE
Christopher Bernard Vere Neilson, Frodsham, and Jack Perdue, Warrington, England, assignors to Electro-Hydraulics Limited, Warrington, England, a corporation of the United Kingdom
Filed Oct. 1, 1965, Ser. No. 492,005
Claims priority, application Great Britain, Nov. 27, 1964, 48,426/64
9 Claims. (Cl. 254—93)

This invention relates to hydro-pneumatic shock absorbers and struts comprising such shock absorbers.

It its broadest aspect this invention provides an extendible and contractible hydro-pneumatic shock absorber. That is, a shock absorber of the hydro-pneumatic type having a neutral position to which it is biassed by the pressure of compressible fluid therein and which is extendible from and contractible from said neutral position by the application of appropriate forces.

According to another aspect this invention provides a combined jack and shock absorber device which is extendable in the manner of a jack by the application of fluid pressure to a part thereof.

According to one embodiment, this invention provides an extendible shock absorber strut, which, in a fully extended condition due to application of relatively incompressible fluid under pressure, is substantially a rigid strut.

According to the present invention a hydro-pneumatic shock absorber or strut comprises a first tube closed at one end and slidable in a second tube, a fluid connection between said first and second tubes which connection includes energy conversion damping means, a third tube closed at one end and in which said second tube is slidable, chambers for relatively compressible and incompressible fluids being provided in said first tube and a chamber for relatively incompressible fluid being provided in said second tube in communication with a chamber formed between said second and third tubes.

Preferably, provision is made to cause the second tube to extend relative the third tube.

Preferably, fluid pressure damping means are provided whereby high pressures of short duration generated in the second tube are not communicated to the third tube. Such means may comprise restrictor means or pressure relief valve means or flow control valve means.

Preferably, a separator piston is provided between said chambers for the relatively compressible and incompressible fluids in said first tube, so that said relatively compressible fluid is trapped between said separator piston and the closed end of said tube.

According to an optional feature the fluid space between said second and third tubes is of such a volume that the fluid expelled during full extension of said second tube relative said third tube causes the separator piston to move substantially to the cosed end of the first tube, thereby providing a substantially rigid strut.

According to a further optional feature mechanical locking means are provided between the second and third tubes whereby the second tube may be locked in its fully extended position relative to the third tube.

Figure 2:
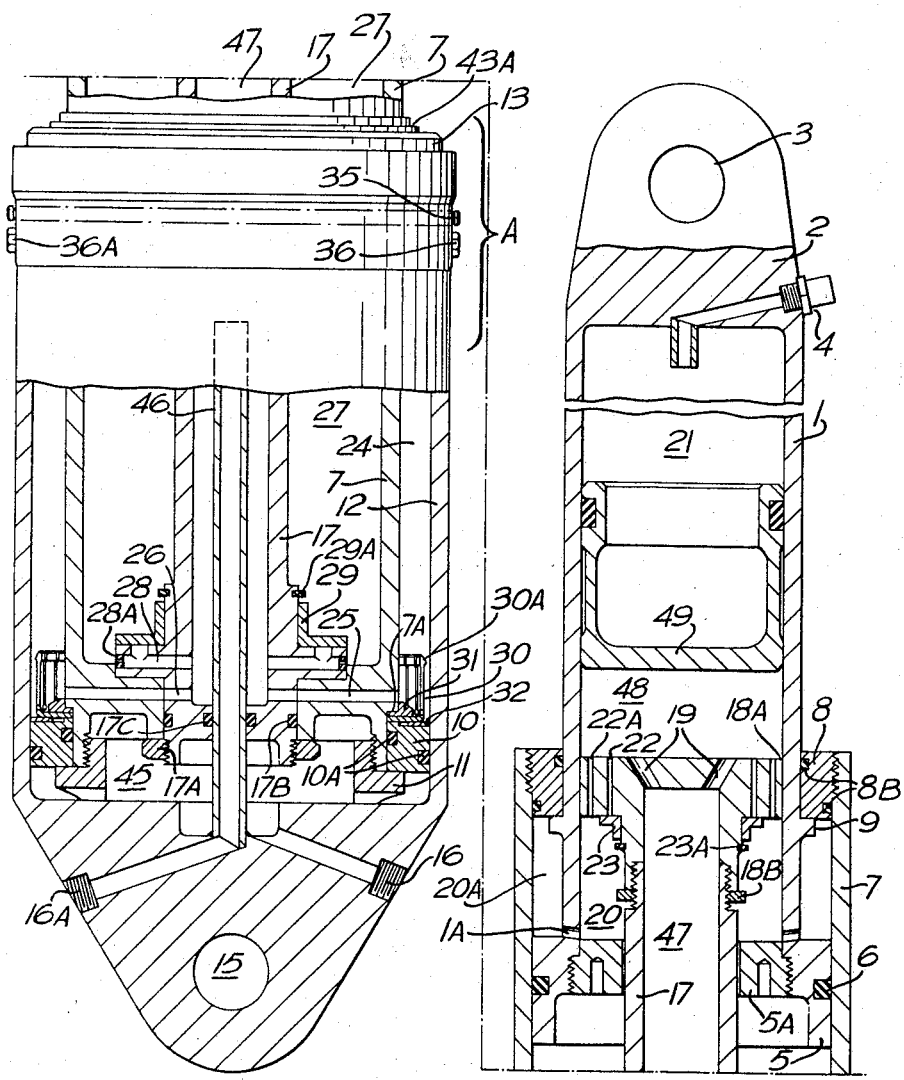
Figure 3:
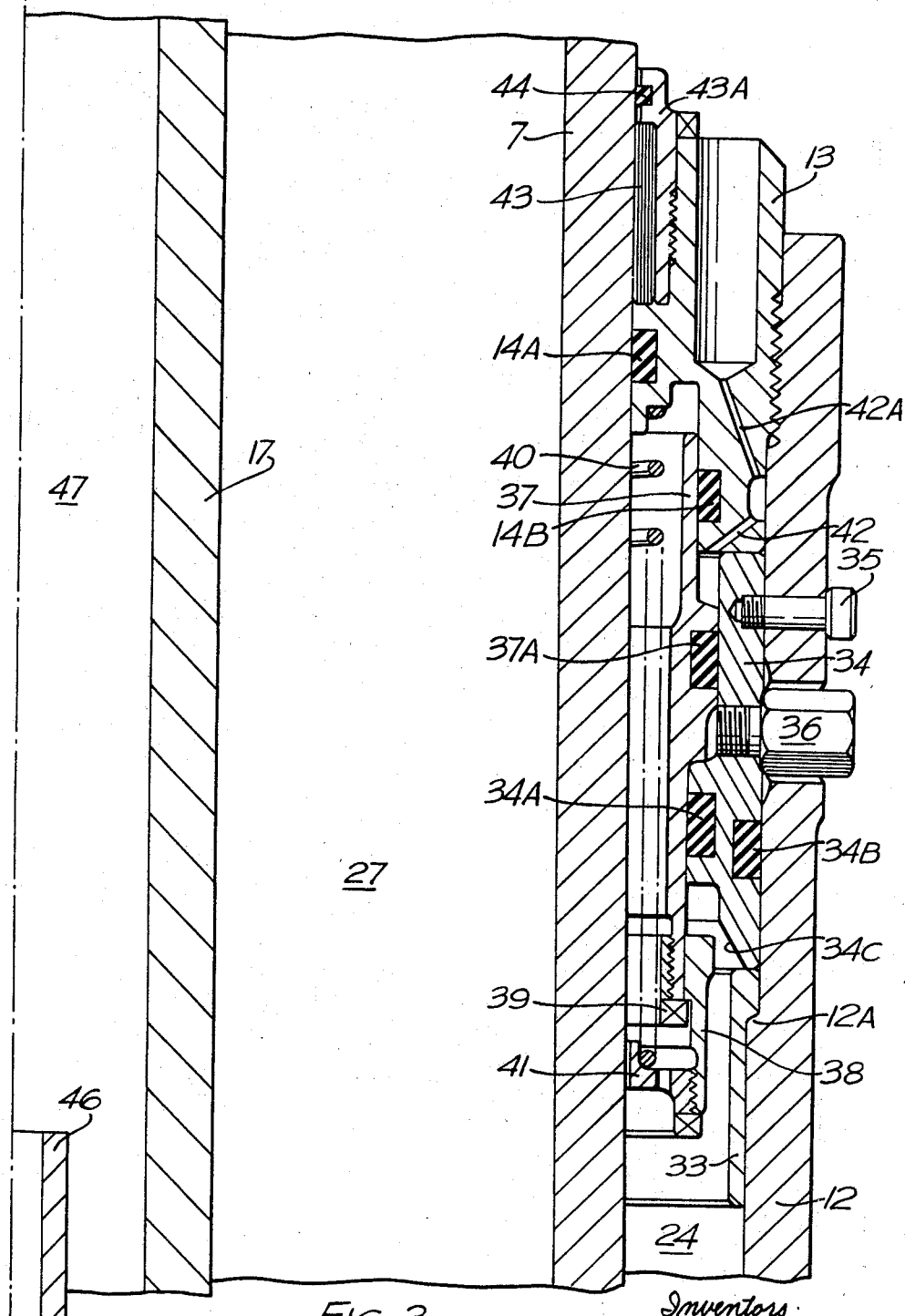

The invention is described with reference to the drawing accompanying the provisional specification in which: the FIGURE 1 is a longitudinal, part-sectional view through a hydro-pneumatic shock absorber and jacking device, and with reference to the accompanying drawings in which:

FIGURE 2 is a longitudinal, part-sectional view through a modified embodiment of hydro-pneumatic shock absorber, and FIGURE 3 is an enlarged sectional view of the locking assembly shown at A in FIGURE 2.

Referring to the figure accompanying the provisional specification, the hydro-pneumatic shock absorber comprises a first tube 1 which is closed at its one end 2 and is provided with an eye 3 for attachment purposes. An inflation point for relatively compressible fluid, e.g., air or other gas, is provided at 4.

The other end of tube 1 has an enlarged portion forming a piston 5 fitted with a fluid pressure seal 6, which piston is slidable in a second tube 7. The one end of the second tube 7 is closed by a bearing ring 8. The first tube 1 has a shoulder 9 thereon which provides a mechanical stop for abutment with the bearing ring 8 to limit extension of the first tube 1 with respect to the second tube 7. A vent may be provided at 8A. An annular piston 10 is fitted to the other end of the second tube 7 (which end will hereinafter be called the lower end) and is secured thereon by a nut 11, the piston 10 being slidable in a third tube 12. The third tube 12 is closed at one end by a gland ring 13 having fluid pressure seals 14. The other end of the third tube 12 is closed and an eye 15 is provided for attachment purposes.

A fluid pressure connection is provided at 16 for admission of pressure fluid to the underside of the piston 10. The lower end of the second tube 7 has a hollow tube 17 mounted concentrically therein and secured by a nut 17A. The hollow tube 17 is closed at its lower end and is increased in diameter at its upper end to provide a guide portion 18 within the tube 1. The upper end of the tube 17 is closed, but drillings 19 are provided to give fluid communication between the bores of the tubes 1 and 17. The tube 17 passes with limited clearance through the piston 5. An annular chamber 20, above the piston 5 between the tubes 17 and 1, is in communication with a chamber 21 in the tube 1 via drillings 22 and a one-way valve 23. An annular chamber 24 between the second and third tubes 7 and 12 is in fluid communication with the bore of the tube 17 via drillings 25, 26. An annular chamber 27 between the tubes 7 and 17 is in communication with the bore of the tube 17 via drillings 28. A one-way valve 29 is provided at the lower end of the tube 17 to provide a supplementary path for fluid flow from the bore of the tube 17 into the chamber 27 via the drillings 28.

Chambers 24, 27, 20 and the bore of the tube 17 and a portion of tube 1 above the guide portion 18 are filled with liquid, e.g., oil, and air (or other gas) under pressure is supplied to the space above the liquid in the chamber 21 and locked therein. The tubes 1 and 7 comprise a conventional shock absorber with two-way damping, the damping being provided by the drillings 28 in conjunction with the one-way valve 29 in the closing direction and the limited clearance between the tube 17 and the piston 5 in conjunction with the one-way valve 23 on extension. When it is desired to extend the shock absorber and jack device, pressure fluid is admitted to the underside of the piston 10 via the connection 16. The liquid in chamber 24 is now transferred into the tube 17 and chamber 27 via the drillings 25, 26 and 28, causing the device to extend. Release of fluid pressure from the connection 16, enables the third tube 12 to be retracted over the second tube 7 due to the compressed air (or other gas) in the chamber 21 forcing liquid back into the chamber 24.

It will be apparent that, if the shock absorber shown in the said figure is supporting a constant load when the jack portion is extended, the shock absorber will also be caused to extend due to the transference of liquid. If, however, on extension of the jack portion, the load supported by the shock absorber increases, the compressible fluid will be further compressed. Clearly, depending on the loads involved, extension of the jack portion may cause extension of the shock absorber and/or further compression of the compressible fluid.

It will be appreciated that according to the above embodiment of this invention, there is provided a compression shock absorber, i.e., a shock absorber which is normally in the extended position when unloaded and which can be further extended e.g., for jacking up a vehicle or aircraft and this has been done with very little increase in the dead length of the shock absorber and without in any way modifying the characteristics of the shock absorber and operable without any adjustment to the liquid or compressible fluid content of said shock absorber. Particular application of such a shock absorber and jack device occurs in multiwheeled aircraft undercarriages in which the movement of the wheels may be controlled by shock absorbers such as that described above. In this application when it is desired, e.g., to carry out servicing on one wheel a strut may be fixed to prevent extension of the shock absorber of that wheel and fluid pressure can then be applied to the connections 16 of the shock absorber and jack devices for the other wheels, whereby the one wheel is then lifted from contact with the ground for servicing.

A more sophisticated embodiment of the invention will now be described with reference to FIGURES 2 and 3 of the accompanying drawings, in which parts corresponding to parts shown in the drawing accompanying the provisional specification are given the same reference numerals.

Referring to FIGURES 2 and 3, it will be seen that the piston 5 includes an annular ring 5A screwed therein which defines a fluid chamber 20 and facilitates assembly. Furthermore, fluid pressure seals are provided on the bearing ring 8 at 8B, on the annular piston 10 at 10A, and two seals 14A and 14B are provided on the gland ring 13. Also, holes 1A are provided in the first tube 1 adjacent the piston 5.

As is shown in FIGURE 2, a resilient sleeve 30, provided with locking claws 30A, is secured between the piston 10 and a spacer 31 which is located on a shoulder 7A of the tube 7, a hard metal shim being provided at 32 and forming an end stop for extension of the tube 7 relative to the tube 12. Referring to FIGURE 3, a locking sleeve 33 is located on a shoulder 12A of the tube 12 and is retained by abutting engagement of a sleeve 34 provided with fluid pressure seals 34A, 34B. The sleeve 34 is secured in the tube 12 by pins 35 and alternative fluid pressure ports are provided at 36, 36A. A lock bolt 37, provided with a fluid pressure seal 37A, is slidable within the sleeve 34 and carries a loose sleeve 38, the bore of which is stepped for retention on the lock bolt 37 by a ring nut 39. A spring 40 is arranged between the gland ring 13 and a collar 41 screwed to the free end of loose sleeve 38. Drillings 42, 42A are provided in the gland ring 13 to vent the space between the seals 14B and 37A. A bearing bush 43 for the tube 7 is located in a housing 43A screwed to the gland ring 13, a wiper ring being provided at 44. It will be observed that the portion of the lock bolt 37 which slides within the seal 14B is of a greater diameter than that portion of the lock bolt 37 which slides within seal 34A and, in consequence, the presence of pressure fluid in the annular chamber 24 formed between the tubes 7 and 12 assists the action of the spring 40 urging the lock bolt 37 towards the resilient sleeve 30.

Referring now to FIGURE 2, a fluid pressure inlet 16 is provided for a chamber 45 at the closed other or lower end of the tube 12 and a further fluid pressure inlet is provided at 16A which inlet leads to a tube 46 secured concentrically in the closed lower end of the tube 12. A tube 17 is secured concentrically in the lower end of the tube 7 by a nut 17A, fluid pressure seals being provided at 17B, 17C between the tube 17 and the tubes 7 and 46, respectively. A guide portion 18A is screw threadedly secured to the tube 17 and is locked by a nut 18B, thereby closing the top end (as viewed on the drawing) of the tube 17. Drillings 19 provide fluid communication between a chamber 47 in the tube 17 and a chamber 48 in the first tube 1, which chamber is defined by the guide portion 18A and a separator piston 49. A fluid chamber 20 is also defined by the guide portion 18A and the annular ring 5A, a further fluid chamber 20A in communication with the chamber 20 via holes 1A in the first tube 1, being defined by the piston 5 and the bearing ring 8. The separator piston 49 divides the chamber 48 which contains relatively incompressible fluid from a chamber 21 in the top end (as viewed in the drawing) of the first tube 1 which contains relatively compressible fluid.

Fluid communication between the chambers 48 and 20 is provided by drillings 22, a non return valve 23 and further drillings 22A.

Drillings 25 and 26 in the tubes 7 and 17, respectively, provide fluid communication between the chambers 24 and 47. The fluid chamber 27, formed between the tubes 7 and 17, is in fluid communication with the chamber 47 via restrictors 28A and drillings 28. A non return valve is also provided at 29. It will be observed that pressure fluid can only pass from the chamber 27 to the chamber 24 via the restrictors 28A and, consequently, peak pressures generated in the chamber 27 are not communicated to the chamber 24, which means the tube 12 need not be so strongly constructed.

In the assembly of the hydro-pneumatic shock absorber described above, the non-return valve 29 is assembled on the tube 17, being retained by a circlip 29A, and then the annular ring 5A is placed over the tube. The non-return valve 23 is assembled, with its retaining circlip 23A, on the guide portion 18a which is then screwed to the tube 17 and locked by the lock nut 18B. The separator piston 49 is inserted in the tube 1 and pushed in so that it abuts the end 2 and is followed by the assembled guide portion 18A and the tube 17. The annular ring 5A is screwed and locked to the piston 5. The end of tube 17 is inserted into the tube 7 and secured thereto by the lock nut 17A. The bearing ring 8 is then fed over the tube 1 and screwed into the end of the tube 7. The inflation connection for compressible fluid can now be fitted at 4. The spacer 31 is fitted to the shoulder 7A on the tube 7, followed by the resilient sleeve 30 and the piston 10 with its shim 32. The piston 10 is now secured to the tube 7 by the nut 11. The assembly comprising the tubes 7 and 17 is now inserted into the tube 12, the tube 46 passing through the central hole in the lower end of tube 17, which end contains the fluid pressure seal 17C.

The locking sleeve 33 is then inserted in the open end of tube 12, to engage on shoulder 12A. The lock bolt 37 is inserted in sleeve 34 and the loose sleeve 38 is passed over the small diameter end of the lock bolt 37 and retained by the nut 39 which screw threadedly engages the lock bolt 37. The collar 41 is now secured to the end of the loose sleeve 38 and the resulting assembly is passed over the tube 7 and inserted into tube 12 so that the sleeve 34 abuts the locking sleeve 33. The pins 35 are then inserted to retain the sleeve 34 in the tube 12. The fluid pressure connections 36 and 36A (if required) are now connected to the sleeve 34 through holes in the tube 12. The spring 40 is then inserted into the lock bolt 37 and the gland ring 13 is passed over the tube 7 and screwed into the tube 12, thus compressing the spring 40. The bearing housing 43A with its bearing bush 43 is now passed over, the tube 7 and secured to the gland ring 13.

Pressure fluid is supplied to the chamber 45 through the inlet 16 to extend the tube 7 fully relative to the tube 12. In this fully extended condition the free end of tube 46 is flush with the lower end of the chamber 47.

The shock absorber is now arranged vertically so that the eye at 15 is uppermost, i.e. it is inverted with respect to the drawing. Relatively incompressible fluid, for example, oil, is now admitted through the inlet 16A, provision being left for escaping air to be vented through this connection. The chamber 48 will fill first, followed by the chambers 20 and 20A, the air displaced being vented through holes 19, the chamber 47 and the tube 46 and through the holes 1A, the clearance between annular ring 5A and the tube 17, the restrictors 28A, the drillings 28, the chamber 47 and the tube 46.

The annular chamber 24 is filled by oil entering through the drillings 26 and 25 and air from the chamber 24 is also vented to the chamber 47 and tube 46 through these drillings. The shock absorber is now filled with incompressible fluid, the separator piston 49 abutting the end of tube 1. Connection 16A is now sealed. Compressible fluid, for example, air, is admitted to the chamber 21 through the inflation connection 4 to inflate the shock absorber to the desired pressure.

Admission of pressure fluid to the connection 36 or 36A will release the automatic lock in a manner to be described, and on connecting the inlet 16 to vent the pressure of air in the chamber 21 will cause the separator piston 49 to move away from the end of tube 1, displacing oil from the chamber 48 into the chambers 47 and 20, whence it also passes into the chamber 24 and the chamber 20A. The passage of oil under pressure to the chamber 24 causes the tube 7 to close into the tube 12 to the position shown in FIGURE 2.

It will now be seen that the application of either a compression load or a tension load will cause the separator piston 49 to move towards the end 2 of the tube 1, thereby compressing the air in the chamber 21. When a compression load is applied, the tube 1 and piston 5 move downwardly in the tube 7, causing the volume of chamber 27 to decrease and the volumes of the chambers 20, 20A, which are filled through the non-return valve 23, to increase. The oil displaced from the chamber 27 passes through the restrictors 28A before passing to the chambers 47 and 48. Energy is absorbed in forcing the oil through the restrictors 28A. When the compression load is released, the air under pressure in the chamber 21 forces the separator piston 49 downwardly, thereby displacing oil back from the chambers 48 and 47 into the chamber 27 via the non-return valve 29. The re-extension of the shock absorber is controlled by the flow of fluid from the chambers 20, 20A through the drillings 22A into the chamber 48, the drillings 22A performing a function similar to that of the restrictors 28A. When a tension load is applied to the shock absorber, oil is displaced from chamber 24 into the chambers 47 and 48 causing movement of the separator piston 49 towards end 2 of tube 1. On release of the tension load the separator piston 49 causes the oil to be returned to the chamber 24.

In the above described shock absorber, the volume of oil displaced from the chamber 24 when the tube 7 is fully extended relative to the tube 12 is made equal to the volume of fluid required to drive separator piston 49 to the end 2 of tube 1. In this construction, no further compression of the air can take place and consequently a substantially rigid strut is provided. This may be of particular value for the nose undercarriage of an aeroplane where it is desired to extend the undercarriage when the aircraft is on the ground so as to give a high angle of incidence to facilitate rapid take off. This may be effected by pumping relatively incompressible fluid, e.g., oil, into the chamber 45 to extend the shock absorber. A mechanical lock, such as that to be described, may be used to lock the shock absorber in the extended position or alternatively it may be locked hydraulically by trapping the oil in chamber 45.

The working of the mechanical lock is as follows. On admission of pressure fluid through the inlet 16 to the chamber 45, the tube 7 is caused to extend relative to the tube 12 so that the locking claws 30A approach the lock bolt assembly. As movement continues the locking claws 30A are forced inwardly by locking sleeve 33 and pass between the locking sleeve 33 and loose sleeve 38 until they abut the shoulder 38A whereupon the loose sleeve 38 is moved by the locking claws 30A against the action of spring 40. When the ends of the locking claws 30A pass the outer end of the locking sleeve 33, the locking claws are enabled to spring outwardly into a recess 34C between the locking sleeve 33 and the sleeve 34. The loose sleeve 38 can now pass inside the locking claws 30A under the action of the spring 40, thus trapping them in the locked position. When it is desired to release the mechanical lock, fluid pressure is admitted to the connection 36, or 36A, causing the lock bolt 37 to move so as to withdraw the loose sleeve 38 from its locking position. The pressure of liquid in the chamber 24 now causes the tube 7 to move into the tube 12, the locking claws 30A riding inwardly from the locking position through the locking sleeve 33.

It will be appreciated that the fluid volume of chamber 24 need not be equal to that required to drive the separator piston 49 to the end 2 of the tube 1. For example, it may be less, in which case, closure of the shock absorber can still take place when the tube 7 is fully extended relative the tube 12.

It will also be appreciated that by the provision of restrictors such as 28A in the drillings 25 or 26, energy absorption will take place when the tube 7 is extended relative the tube 12, for example, when a tension load is applied to the shock absorber.

What is claimed is:

1. A hydro-pneumatic shock absorber comprising a first tube and a second tube, said first tube being closed at one end and slidable in said second tube, a fluid connection between said first and second tubes, energy conversion damping means included in said fluid connection, a third tube closed at one end and having said second tube slidable therein, a chamber for relatively compressible fluid and a chamber for relatively incompressible fluid both within said first tube, a chamber for relatively incompressible fluid within said second tube and a chamber formed between said second and third tubes, said latter chamber being in communication with said chamber for relatively incompressible fluid within said second tube.

2. A shock absorber as claimed in claim 1 wherein said chamber for the relatively compressible fluid in said first tube is situated towards said closed end thereof, and further including a separator piston within said first tube to isolate said two chambers therein.

3. A shock absorber as claimed in claim 1, in which independent means are provided operable to cause extension of said second tube relative to said third tube.

4. A hydro-pneumatic shock absorber comprising a first tube and a second tube, said first tube being closed at one end and slidable in said second tube, a fluid connection between said first and second tubes, a third tube closed at one end and having said second tube slidable therein, a chamber for relatively compressible fluid and a chamber for relatively incompressible fluid both within said first tube, a chamber for relatively incompressible fluid in said second tube, a chamber formed between said second and third tubes, said latter chamber being in communication with the chamber for relatively incompressible fluid within said second tube, and means whereby said second tube may be extended relative said third tube.

5. A hydro-pneumatic shock absorber as claimed in claim 4 and including mechanical locking means between said second and third tubes, which locking means are engageable for full extension of the said tubes relative one another, thereby to provide a rigid strut.

6. A hydro-pneumatic shock absorber as claimed in claim 5, and including independent fluid pressure operated means operable to release said locking means.

7. A combined hydro-pneumatic shock absorber and jacking device comprising a first tube and a second tube, said first tube being closed at one end and slidable in said second tube, a fluid connection between said first and second tubes, energy conversion damping means incorporated within said fluid connection, a third tube closed at one end and having said second tube slidable therein, a separator piston within said first tube, which piston divides the interior of said tube into a chamber for relatively compressible fluid, which chamber is adjacent the closed end of the tube, and a chamber for relatively incompressible fluid, a chamber for relatively incompressible fluid within said second tube, a chamber formed between said relatively slidable second and third tubes, said latter chamber being in communication with said chamber within said second tube, fluid pressure operated jacking means operable to cause extension of said second tube relative said third tube, locking means, operable on full extension, to lock said second tube relative said third tube, thereby to provide a rigid strut, with the separator piston at the closed end of the first tube, and independent fluid pressure operated means provided on said third tube to release said locking means.

8. A combined shock absorber and jacking device as claimed in claim 7, in which further energy conversion damping means are provided acting during extension of said second tube from said first tube.

9. A shock absorber as claimed in claim 1, in which fluid pressure restrictors are provided in the fluid path between said second and third tubes, whereby high pressures of short duration generated in said second tube are not communicated to said third tube.

References Cited

UNITED STATES PATENTS

| 2,363,485 | 11/1944 | Down | 267—64 |
| 2,492,765 | 12/1949 | Porath | 244—102 |
| 2,679,827 | 6/1954 | Perdue | 92—8 |

FOREIGN PATENTS 872,265   7/1961   Great Britain.

OTHELL M. SIMPSON, *Primary Examiner.*